US008553437B2

(12) United States Patent
Berggren et al.

(10) Patent No.: US 8,553,437 B2
(45) Date of Patent: Oct. 8, 2013

(54) METHOD AND CONTROL DEVICE FOR CONTROLLING POWER FLOW WITHIN A DC POWER TRANSMISSION NETWORK

(75) Inventors: Bertil Berggren, Vasteras (SE); Rajat Majumder, Raleigh, NC (US); Charles Sao, Västerås (SE); Kerstin Linden, Ludvika (SE)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 13/807,615

(22) PCT Filed: Jun. 30, 2010

(86) PCT No.: PCT/EP2010/059311
§ 371 (c)(1),
(2), (4) Date: Feb. 7, 2013

(87) PCT Pub. No.: WO2012/000549
PCT Pub. Date: Jan. 5, 2012

(65) Prior Publication Data
US 2013/0127426 A1    May 23, 2013

(51) Int. Cl.
*H02J 1/00* (2006.01)
*H02J 3/00* (2006.01)

(52) U.S. Cl.
USPC ............................................. 363/65; 363/34

(58) Field of Classification Search
USPC ............................. 363/65, 67, 69, 71, 34–37
See application file for complete search history.

(56) References Cited

U.S. PATENT DOCUMENTS 6,250,174 B1    6/2001  Terada et al.
6,297,976 B1 *  10/2001 Isono ............................. 363/65
7,513,174 B2    4/2009  Harada et al.
7,656,052 B2    2/2010  Jones et al.
7,944,090 B2 *  5/2011  Chang et al. .................... 307/72
2009/0279328 A1 11/2009 Jiang-Häfner
2010/0025994 A1  2/2010  Cardinal et al.
2011/0205771 A1  8/2011  Bernhard et al.

FOREIGN PATENT DOCUMENTS

EP       0 233 712 A2     8/1987
JP       2-298482 A      12/1990
WO    WO 2009/152840 A1  12/2009

OTHER PUBLICATIONS

Johnson et al., "Expandable Multiterminal DC Systems Based on Voltage Droop," IEEE Transactions on Power Delivery, vol. 8, No. 4, Oct. 1993, pp. 1926-1932.

(Continued)

*Primary Examiner* — Matthew Nguyen
(74) *Attorney, Agent, or Firm* — Birch, Stewart, Kolasch & Birch, LLP

(57) ABSTRACT

A method for controlling power flow within a DC power flow within a DC power transmission network includes two or more interconnected converter stations. The method includes the steps of: establishing a common feedback signal ($U_{d,common}$, $\tilde{U}_{d,common}$) to the converter stations, the common feedback signal ($U_{d,common}$, $\tilde{U}_{d,common}$) being based on an overall voltage level in the DC transmission, power network; providing, in the converter stations, a control signal ($S_1$, $S_2$, $S_3$, $S_4$) based on the common feedback signal ($U_{d,common}$) and a drooped error signal ($P_{e,droop}$, $U_{e,droop}$); and controlling the power flow within the DC power transmission network towards set operating points ($U_d^{ref}$, $P_{CC}^{ref}$) by using the control signal ($S_1$, $S_2$, $S_3$, $S_4$). A control device and computer program product is also described.

20 Claims, 6 Drawing Sheets

(56) References Cited

OTHER PUBLICATIONS

Karlsson, "DC Distributed Power Systems Analysis, Design and Control for a Renewable Energy System," 2002 Per Karlsson, Printed in Sweden by Media-Tryck, Lund University Lund 2002, pp. 1-192.
Majumder et al., "Droop Control of Converter Interfaced Micro Sources in Rural Distributed Generation.", 2010.
Peng et al., "Control and Protection of Power Electronics Interfaced Distributed Generation Systems in a Customer-Driven Microgrid.", 2009.
Xu et al., "DC Grid Management of a Multi-Terminal HVDC Transmission System for Large Offshore Wind Farms," Sustainable Power Generation and Supply, 2009, Supergen '09, International Conference on, IEEE, Apr. 6, 2009, XP031639926, pp. 1-7.

* cited by examiner

METHOD AND CONTROL DEVICE FOR CONTROLLING POWER FLOW WITHIN A DC POWER TRANSMISSION NETWORK

FIELD OF THE INVENTION

The invention relates generally to the field of power transmission systems, and in particular to power flow control in multi-terminal DC power transmission systems.

BACKGROUND OF THE INVENTION

Control of High Voltage Direct Current (HVDC) power transmission systems, denoted DC grids in the following, is a challenging task and HVDC transmissions have up to date essentially equaled point-to-point two station transmissions. However, the introduction of voltage source converter (VSC) technology has provided the possibility of controlling larger DC grids, i.e. controlling multi-terminal DC grids.

FIG. 1 illustrates a simplified single line diagram of a VSC converter. The VSC converter is on its AC side connected to a point of common coupling (PCC) in an ac network and on its dc side connected to a dc transmission.

Conventionally, the VSC converter station is controlled by controlling AC voltage $U_{PCC}$ at the PCC or the amount of reactive power injected into the AC network at the PCC, and controlling DC voltage ($I_d$ at the DC terminal of the converter or the amount of active power injected into the AC network ($P_{PCC}$).

For a typical point-to-point HVDC transmission based on VSC technology, one station is controlling the local voltage $U_d$, striving to keep a constant dc-voltage, and the other station is controlling the local $P_{PCC}$, adjusting its DC voltage so as to reach a set reference power $P_{PCC}^{ref}$. The DC voltage controlling station outputs any amount of power within design limits such that the power controlling station reaches its control objective, i.e. the power of the power control station tracks its power reference.

SUMMARY OF THE INVENTION

If extending the above concept, i.e. of having one station in DC voltage control and the other stations in power control, to the multi-terminal DC grid one would encounter several difficulties. The DC voltage controlling station would act as a slack node for the rest of the DC grid. If a converter other than the DC voltage controlling station is disconnected due to a fault, the DC voltage controlling station would have to pick up the load of the failed converter station. This in turn implies that the DC voltage controlling station would have to be controlled in a way so as to have spare capacity available in case of a disturbance. Further, the AC system connected to the DC voltage controlling station would be exposed to large power swings if converter stations are lost. If the DC voltage controlling station is disconnected, the situation is aggravated; without a DC voltage control, the post-disturbance operating point would most likely be defined by various limiters of the converter stations and thus most likely impede the power transfer of the complete DC grid.

Droop control is another approach for handling disturbances. Droop control in DC grids is described in, for example, "Control of Multiterminal HVDC Transmission for Offshore Wind Energy", T. Haileselassie et al. In this document, a solution using droop control is disclosed, wherein the aim is to avoid communication between the converter stations and wherein the control therefore is based on local measurements.

Droop control is a method commonly used for load sharing between generators for frequency control in AC grids in case of generator outages. A natural idea could therefore be to introduce droop control also for DC grids for load sharing between converters in case of converter outages.

However, whereas the AC grid has a common signal for all generators, namely the steady state frequency, the DC grid has no such common signal locally available for all converters to use for load sharing. Therefore, using droop control for the DC grid suffers from poor reference tracking of set-points. The main reason for this is that the dc voltage varies between different converter stations due to voltage drops along transmission lines between the interconnected converter stations.

In view of the above, it is a general object of the present invention to provide means and methods for enabling reliable power flow control within multi-terminal DC grids, and in particular controlling a multi-terminal DC grid so as to overcome or at least alleviate the above-mentioned difficulties.

It is an object of the invention to provide a reliable method for controlling a DC grid and in particular enable efficient load sharing in the multi-terminal DC grid during disturbances.

It is yet another object of the invention to provide such method for controlling the DC grid comprising power flow droop control suitable and adapted for DC grids, and in particular multi-terminal DC grids, enabling reliable operation of the DC grid during steady state as well as during disturbances.

It is a further object of the invention to provide a method for controlling a DC grid that is functional even during failing communication between converter stations.

These objects, among others, are achieved by a method for controlling power flow in a multi-terminal DC power transmission system and by a corresponding control device and computer program product as claimed in the appended independent claims.

In accordance with the invention a method for controlling power flow within a DC power transmission network is provided. The DC power transmission network comprises two or more interconnected converter stations. The method comprises the steps of: establishing a common feedback signal to the converter stations, the common feedback signal being based on an overall voltage level in the DC transmission power network; providing, in the converter stations, a control signal based on the common feedback signal and a drooped error signal; and controlling the power flow within the DC power transmission network towards set operating points by using the control signal. The invention provides a method that enables reliable control of the DC power transmission network, by providing a common feedback signal for all converter stations. The common feedback signal results in a highly improved reference tracking of set-points. An accurate load sharing in the DC grid during disturbances is further accomplished and also accurate steady-state operation.

In an embodiment, the converter stations comprises communication means enabling communication them between. The step of establishing the common feedback signal then comprises communicating, by means of the communication means, the common feedback signal to all converter stations.

In an embodiment, the common feedback signal is determined as the voltage level measured at a predetermined converter station and then communicated to all of the other converter stations.

In another embodiment, the common feedback signal determined by combining, e.g. as an average, of voltage levels measured at a number of converter stations.

In another embodiment, a number of the converter stations regulates its respective voltage in dependence on the common feedback signal and in proportion to a droop constant D that is individually determined for each particular converter station.

In the previous embodiment, the method may then comprise the further step of adapting the droop constant D in dependence on whether communication between the converter stations is available or not. In case communication is lost for some reason, a reliable backup is provided.

In another embodiment, the method comprises the further step of adapting the voltage reference in dependence on whether communication between the converter stations is available or not.

In another embodiment, in case communication is used for establishing the common feedback signal, and in case the of communicating the common feedback signal fails, the common feedback signal is instead estimated by means of local measurements in each of the converter stations. In case communication is lost for some reason, a reliable backup is thus provided.

In the previous embodiment, the method may then comprise determining the common feedback signal by $$\tilde{U}_{d,common} = U_d - RI_d$$

where $I_d$ is a measured current injected into the DC power transmission network by each respective converter station and where R is a compensation factor. By means of this, a stable method is provided also in that a reliable power flow and load distribution is obtained even during communication failures between the converter stations. The DC power transmission network employing the method is capable of operating and surviving a single contingency such as loss of a converter station or a transmission line even when the converter stations cannot exchange control signals with one another.

In still another embodiment, the step of establishing a common feedback signal for the converter stations, comprises determining the common feedback signal based on local measurements in each of the converter stations.

In another embodiment, the method comprises the further step of filtering the common feedback signal by the low-pass filter before using it in regulating voltage and/or power of the converter station. The cut-off frequency of the filter may advantageously be chosen low, thereby capturing the steady state behavior of the common feedback signal. The dynamic performance of the method is thereby improved.

In another embodiment, the method comprises the further step of preventing the common feedback signal from exceeding a pre-set limit. The scheduling of power references of the converter stations may be done in such a way that no individual converter station violates its control limits upon loss of one of the converter stations in the DC grid.

Further features, defined in further dependent claims, of the invention and advantages thereof will become evident upon reading the following detailed description.

The invention also relates to a control device in such DC power transmission system, and computer program products, whereby advantages similar to the above are achieved.

BRIEF DESCRIPTION OF THE DRAWINGS

FIGS. 4b, 4c and 4d illustrate variations of the basic principle of FIG. 4a.

DETAILED DESCRIPTION OF EMBODIMENTS OF THE INVENTION

Figure 1:
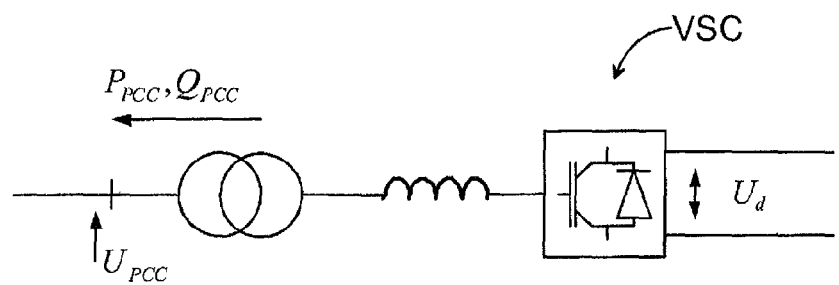
FIG. 1 illustrates a simplified single line diagram of a VSC converter.

Same reference numerals are used throughout the figures for denoting same or corresponding parts.

Figure 2A:
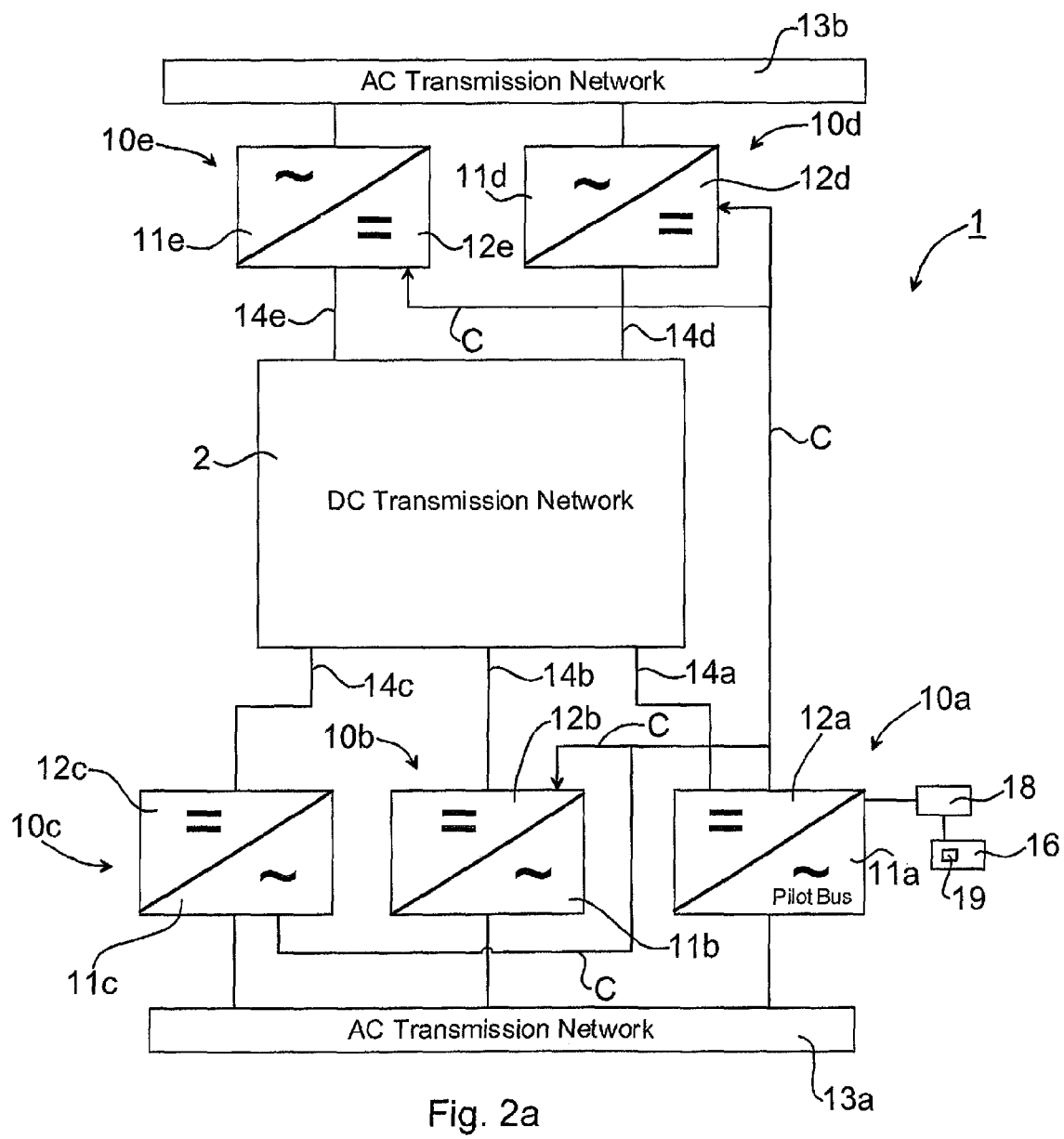
FIG. 2a illustrates a multi-terminal DC power transmission system wherein the present invention may be implemented.

FIG. 2a illustrates a multi-terminal DC power transmission system 1, in the following denoted DC grid 1 for simplicity, in accordance with the invention. The DC grid 1 is preferably a high voltage (HV) DC grid and comprises any number of converter stations, although 5 converter stations are illustrated in FIG. 2a. The converter stations 10a, 10b, 10c, 10d, 10e in turn comprise inverters converting DC to AC and/or rectifiers converting AC to DC. Other components and means conventionally used within a power network for enabling DC power transmission, but not forming part of the invention, may also be included but are omitted from the description and figures in order of simplicity.

The converter stations 10a, 10b, 10c, 10d, 10e comprises an AC side 11a, 11b, 11c, 11d, 11e connectable to an AC network 13a, 13b. It is noted that there could be another number of AC networks. The converter stations 10a, 10b, 10c, 10d, 10e further comprises a DC side 12a, 12b, 12c, 12d, 12e connectable to a DC transmission network 2 for power transmission. The converter stations 10a, 10b, 10c, 10d, 10e may be interconnected in any suitable manner.

The converter stations 10a, 10b, 10c, 10d, 10e may be interconnected by means of power transmission lines, also denoted cable lines, or by overhead lines in a known manner. Such power transmission lines allows the power transmission and are illustrated in the FIG. 2a at reference numerals 14a, 14b, 14c, 14d, 14e.

The converter stations 10a, 10b, 10c, 10d, 10e are further interconnected by suitable communication means C for allowing data exchange between the converter stations.

Each converter station 10a, 10b, 10c, 10d, 10e comprises a local control unit, illustrated at reference numeral 18a for converter station 10a. The control unit 18a enables, among other things, power and/or voltage regulation in the converter station. The local control unit 18a may for example be a general purpose computer comprising appropriate software instructions enabling the desired control functions.

Figure 3:
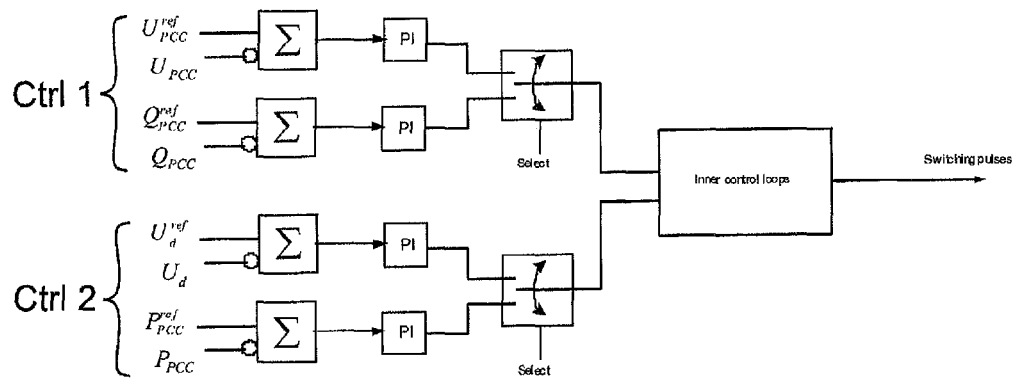
FIG. 3 is an illustration of converter control in general.

In order to more thoroughly describe the present invention, an overview of the control of converter stations is briefly described with reference to FIG. 3. As mentioned earlier, there are typically two ways of controlling the converter of the converter station:

- control the AC voltage $U_{PCC}$ at the PCC or the amount of reactive power $Q_{PCC}$ injected into the AC network at the PCC, i.e. the two alternative branches of the upper part (Ctrl 1) of FIG. 3, and
- control the DC voltage $U_d$ at the DC terminals of the converter or the amount of active power $P_{PCC}$ injected into the AC network, i.e. the two alternative branches of the lower part (Ctrl 2) of FIG. 3.

The present invention is related to the second control, i.e. Ctrl 2 of FIG. 3. The PI controllers of the illustrated outer control loops are provided to achieve good reference tracking of reference values. The output from the selector, to which the outputs of the PI controllers are input, is fed to inner control loops which can be implemented in any known manner. The inner control loops then provide switching pulses to semiconductor devices of the converters such that the control objective is fulfilled.

The power flow control method in accordance with the invention is based on that, for steady state operation of the DC grid 1, the following relation is true:

$$\sum_{rectifiers} P_{PCC} + \sum_{inverters} P_{PCC} + P_{losses} = 0 \quad (1)$$

wherein $P_{PCC}$ is active power injected into the AC networks connected to converter stations 10a, 10b, 10c, 10d, 10e at the point of common coupling and is summed over all rectifiers within the DC grid 1 and over all inverters of the DC grid 1, respectively, $P_{losses}$ is the power losses of the DC grid 1, and wherein it is assumed that $P_{PCC}$ is positive into the AC network. The basic principle of the present invention is based on the circumstance that if $$\left| \sum_{rectifiers} P_{PCC} \right|$$

increases, then the overall dc voltage level within the DC grid 1 tends to increase, and conversely, if $$\left| \sum_{rectifiers} P_{PCC} \right|$$

decreases, then the overall dc voltage level within the DC grid 1 tends to decrease, and if $$\left| \sum_{inverters} P_{PCC} \right|$$

increases then the overall voltage level of the DC grid tends to decrease, and conversely, if $$\left| \sum_{inverters} P_{PCC} \right|$$

decreases then the overall voltage level of the DC grid tends to increase. This overall voltage level is reflected in all voltage measurements made in the network and this circumstance is used in the present invention for providing, to all converter stations, a feedback signal in common to them all.

In accordance with the invention, a common feedback signal $U_{d,common}$ is thus used for all converter stations 10a, 10b, 10c, 10d, 10e. The common feedback signal is a common dc voltage $U_{d,common}$, which is a dc voltage that is made available at all the converter stations 10a, 10b, 10c, 10d, 10e and common for them all. The voltage $U_{d,common}$ should reflect the overall voltage level in the DC grid 1.

$U_{d,common}$ may be selected in a number of different ways, to be described more in detail later, as long as the same voltage is made available in all the converter stations 10a, 10b, 10c, 10d, 10e. Therefore, it follows that all the converter stations 10a, 10b, 10c, 10d, 10e should also have the same set point voltage, a set reference voltage $U_d^{ref}$. Further, in accordance with the invention, an error droop, e.g. a power error droop is taken into consideration.

Figure 4A:
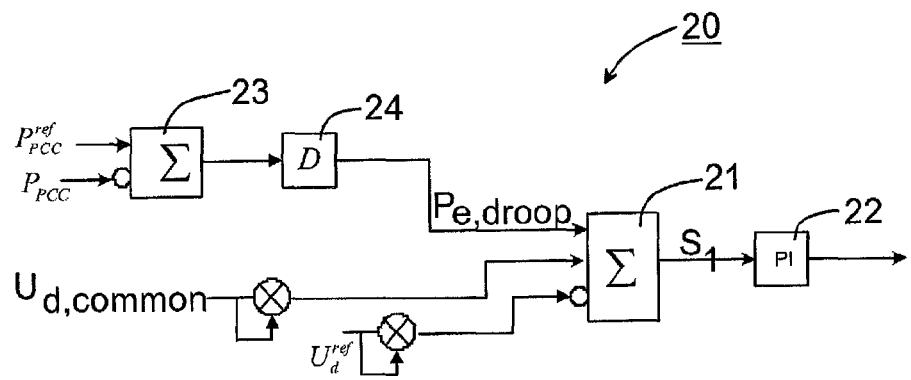
FIG. 4a illustrates the basic principles of the present invention.

With reference to FIG. 4a, the above basic principle of the invention will now be described further. In particular, FIG. 4a illustrates a control means 20 within the local control unit 18a of converter station 10a for controlling the power flow within the DC grid 1. The other converter stations may have corresponding control means, but these are not illustrated in the figure. The control means 20 may be implemented as software executed on a processing means, such as a computer or microprocessor, and/or hardware and/or firmware.

In accordance with the invention, a droop control mode is introduced. In particular, the second control alternative of FIG. 3, i.e. Ctrl 2 is, in accordance with the present invention, replaced by the droop control mode illustrated in FIG. 4a. $U_{d,common}$ and $U_d^{ref}$ voltage-squared are supplied to a first adding device 21. Further, the difference between $P_{PCC}$ and $P_{PCC}^{ref}$, is a set power reference, is formed at a second adding device 23. The difference is then multiplied with a droop constant D at multiplier 24 providing a signal $P_{e,droop}$, which is input to the first adding device 21. The control signal, denoted $S_1$, that is output from the second adding device 21 is thus $D^*(P_{PCC}^{ref}-P_{PCC})+(U_{d,common})^2-(U_d^{ref})^2$ and the control signal $S_1$ is input to a PI-regulator 22 comprising conventional regulating means such as for example proportional gain device and integral gain device. The signal outputted from the PI regulator 22 is used in conventional inner control loops for providing switching pulses to semiconductor devices of the converter stations, as mentioned with reference to FIG. 3.

The above droop control mode is implemented in the control means 20 within the local control units 18a, 18b, 18c, 18d, 18e of the converter stations intended for such droop control, i.e. for converter stations intended for taking part in load sharing at disturbances.

Assuming that communication is available at all converter stations, and all control units 18a, 18b, 18c, 18d, 18e operating in the inventive droop control mode and that operating limits are fulfilled, then the following is true at steady state:

$$D^*(P_{PCC}^{ref}-P_{PCC})+(U_{d,common})^2-(U_d^{ref})^2=0 \quad (4)$$

The power references used are preferably selected in such a way that the losses are accounted for. Given this, the common reference signal $U_{d,common}$ track the respective voltage references without any steady state error.

Equation (4) can be rewritten as $$P_{PCC} = P_{PCC}^{ref} + \frac{1}{D}\left(U_{d,common}^2 - \left(U_d^{ref}\right)^2\right) \quad (5)$$

Summing up for all converter stations gives:

$$\sum_{k=1}^{n} P_{PCC,k} = \sum_{k=1}^{n} P_{PCC}^{ref} + (U_{d,common}^2 - (U_d^{ref})^2) \sum_{k=1}^{n} \frac{1}{D_k} \quad (6)$$

Using equation (1) gives $$(U_d^{ref})^2 - U_{d,common}^2 = \frac{\sum_{k=1}^{n} P_{PCC}^{ref} + P_{losses}}{\sum_{k=1}^{n} \frac{1}{D_k}} \quad (7)$$

It is possible to compensate for the power losses in the power scheduling, and thus the numerator of equation (7) becomes zero, and the voltage error at the converter station would be $(U_d^{ref}) - U_{d,common}^2 = 0$ The local voltages of the converter stations should stay within their respective operating limits, i.e. $U_d^{min} \leq U_d \leq U_d^{max}$. By adjusting the DC voltage references $U_d^{ref}$, which are the same for all converter stations of the DC grid 1, the voltage profile can be centered in the available voltage range. The power error of the converter station is then:

$$P_{PCC,k}^{ref} - P_{PCC,k} = \frac{U_{d,common}^2 - (U_d^{ref})^2}{D_k} \quad (8)$$

Each converter station k thus tracks its power reference perfectly during steady state.

During an outage of e.g. a converter station it can be shown that the scheduled power of the disconnected converter station will essentially be shared among the remaining converter stations proportionally to the inverse of their droop constant $D_k$.

The inventive droop control mode provides a feedback control wherein, at steady state and assuming no limiter action, a set operating point is reached by using a quantity $q_{Ud,error}$ reflecting the dc voltage error and a quantity $q_{P,error}$ reflecting the ac power error, for which the following relation hold:

$$q_{Ud,error} = Dq_{P,error}$$

That is, the quantity reflecting the dc voltage error is proportional to the quantity reflecting the ac power error.

Figure 4B:
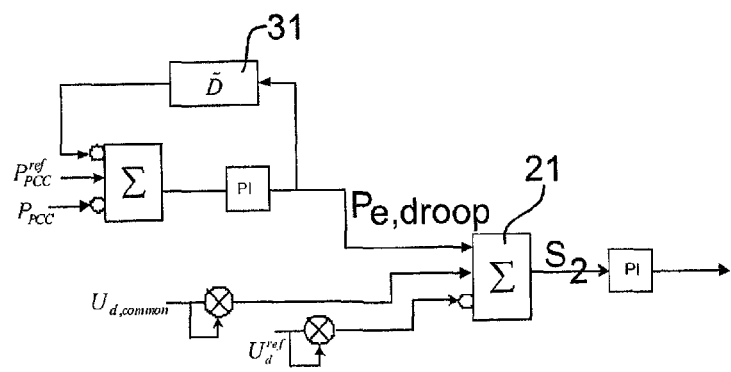
Figure 4C:
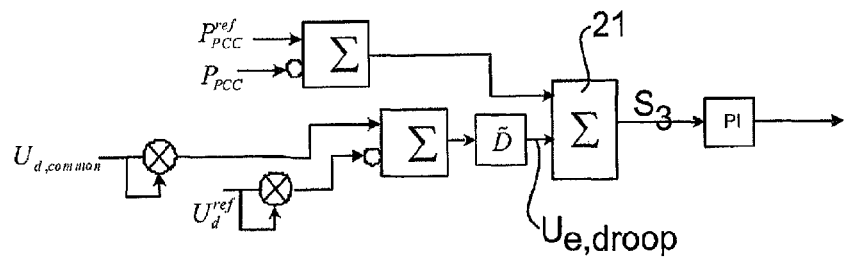
Figure 4D:
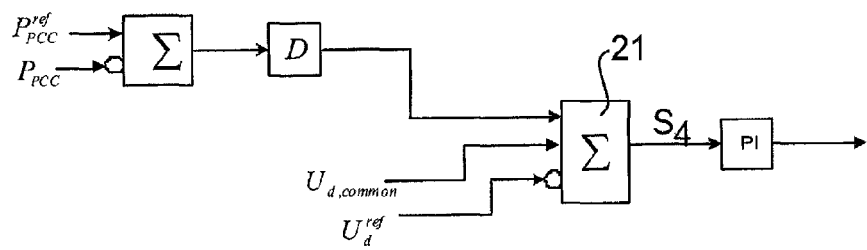

Given the above, FIGS. 4b, 4c and 4d illustrate variations of the basic principle described in relation to FIG. 4a.

FIG. 4b illustrates a first variation of the embodiment of FIG. 4a, wherein the feed forward branch of FIG. 4a has been replaced with a feedback loop 31. The control signal, denoted $S_2$, that is output from the second adding device 21 is $\tilde{D}*(P_{PCC}^{ref} - P_{PCC}) + (U_{d,common})^2 - (U_d^{ref})^2$. At steady state equation (4) would hold for also for the configuration illustrated in FIG. 4b assuming that $\tilde{D}=1/D$.

FIG. 4c illustrates a second variation of the embodiment of FIG. 4a, wherein the voltage error is drooped. The control signal, denoted $S_3$, that is output from the second adding device 21 is thus $(P_{PCC}^{ref} - P_{PCC}) + \tilde{D}((U_{d,common})^2 - (U_d^{ref})^2)$. Again, at steady state equation (4) would hold for also for the configuration illustrated in FIG. 4c assuming that $\tilde{D}=1/D$.

FIG. 4d illustrates yet another variation of the embodiment of FIG. 4a, wherein linear droop is used. The signal output from the second adding device 21 is $(P_{PCC}^{ref} - P_{PCC})D + U_{d,common} - U_d^{ref}$, which at steady state would equal zero. The same variations as for FIG. 4a, could be implemented for this linear droop. It is realized that yet additional ways of obtaining the desired droop control mode could be implemented.

Two main approaches can be identified for providing the common feedback signal $U_{d,common}$:

1) $U_{d,common}$ is obtained through communication between the converter stations.

2) $U_{d,common}$ is obtained through local measurements in each respective converter station.

In both cases, a common feedback signal is provided. In the second case, i.e. in the absence of communication between the converter stations, the feedback signal that is common to all converter stations is estimated to indeed reflect the overall voltage level of the communication network, as opposed to using a local measurement that is only representative to the voltage level at that particular converter station.

Figure 2B:
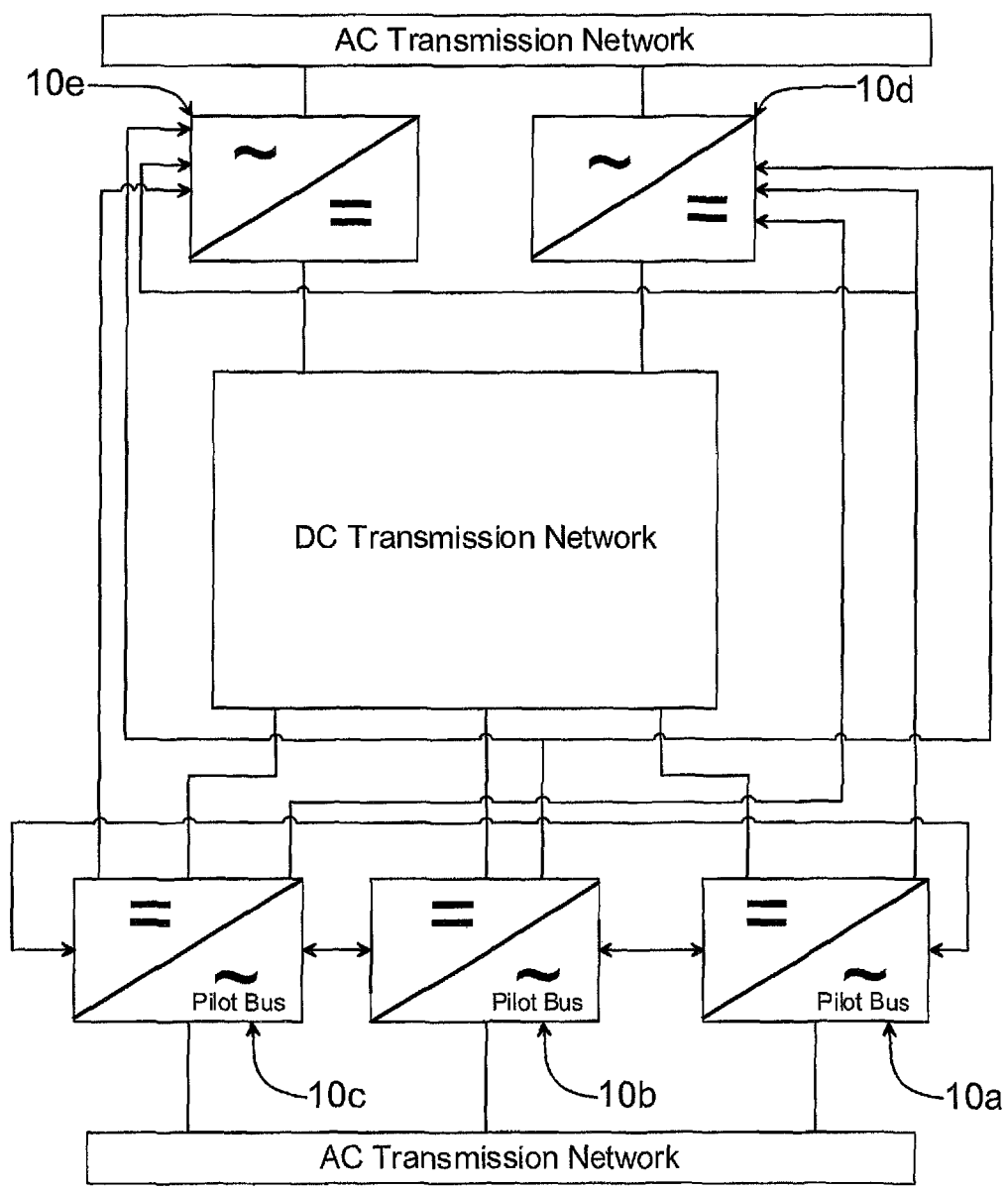
FIG. 2b illustrates the multi-terminal DC power transmission system of FIG. 2a, with another communication means.

For the first case, wherein communication is used, there are several alternative approaches. $U_{d,common}$ may be obtained as the dc voltage measured at a specific, pre-selected node in the DC grid 1, also referred to as a pilot node. $U_{d,common}$ is then communicated to all the converter stations 10a, 10b, 10c, 10d, 10e. The pilot node could be selected as any one of the converter stations, in FIG. 2a, converter station 10a is chosen as the pilot node. The communication means C could then comprise one way communication from the chosen pilot node 10a to all other converter stations 10b, 10c, 10d, 10e as is illustrated in FIG. 2b.

As another example, a number of converter stations can be chosen to be pilot nodes, and voltage measurements at these pilot nodes are used for calculating the common feedback signal $U_{d,common}$. As an example, converter stations 10a, 10b, 10c are chosen as pilot nodes. The communication means C for communicating the common feedback signal $U_{d,common}$ could then be implemented in different ways. For example, all three measurements can be sent to all converter stations 10a, 10b, 10c, 10d, 10e, whereupon the communication means C would have to comprise two way communication between converter stations 10a, 10b, 10c to 10d and 10e, as is illustrated in FIG. 2b. Using more than one pilot node introduces some redundancy in the forming of the common feedback signal $U_{d,common}$, however at the expense of requiring a more elaborate communication means C.

$U_{d,common}$ may thus be obtained as a combination of several voltage measurements at different pilot nodes. As an example, the combination of voltage measurements may comprise an average of voltage measurements from all the pilot nodes. The combination is then communicated to all converter stations as the common feedback signal $U_{d,common}$.

In the following, one embodiment is described for the second case, wherein $U_{d,common}$ is obtained through local measurements in each converter station and by compensation. In this embodiment, $U_{d,common}$ is obtained through compensation:

$$\tilde{U}_{d,common} = U_d - RI_d \quad (9)$$

wherein $I_d$ is the current injected into the DC grid 1 by the converter station, $U_d$ is the local converter voltage and R is a compensation factor. R can be seen as a virtual resistance. This control mode, i.e. without communication, is still based on the initially described basic idea of $$\sum_{rectifiers} P_{PCC} + \sum_{inverters} P_{PCC} + P_{losses} = 0$$

and thus on equation (3), but further on an equivalent star network existing.

It can be shown that each converter station also for this case, i.e. with lost communication, tracks its power reference very well.

Figure 5:
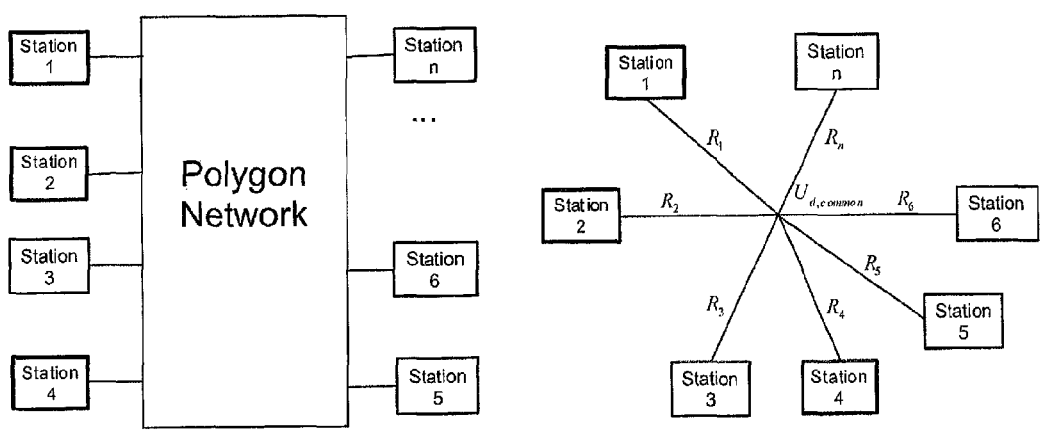
FIG. 5 illustrates transformation of polygon network to star network.

The present invention is applicable to any network configuration, and the above approach for the above case of no communication between the converter stations is, as mentioned, based on the assumption that there exists an equivalent star network, for a general configured network. This assumption, illustrated in FIG. 5, is in general not true. Instead compensation factors giving approximately the dc voltage $\tilde{U}_{d,commom}$ in a virtual point can be used. A slight deterioration of the reference tracking capability will be introduced by this approximation. However, it will be substantially better than prior art solutions using only local measurements.

A delta configuration has an exact equivalent star network, but the transformation from a polygon configuration to a star configuration is in general not possible. In order to obtain as good approximation as possible for the transformation from a polygon configuration to the star configuration different approaches can be used. There are numerous alternative schemes for finding approximate star equivalents for a given polygon network, and the choice should be based on the particular prerequisites for the system at hand. The aim of the transformation is to find compensations factors such that the common feedback signals of equation (5) $\tilde{U}_{d,common} = U_d - RI_d$ are as close to an equivalent as possible to the star point voltage of the equivalent network, and thus to each other.

In accordance with the invention, an arbitrary number of the converter stations 10a, 10b, 10c, 10d, 10e may be controlled by means of the described droop control method, and the remaining converter stations may be controlled by conventional means, for example, the second control alternative of FIG. 3, i.e. Ctrl 2. The converter stations in droop control mode will share the load corresponding to the load of the lost converter approximately in proportion to the inverse of their droop constant, as described above.

Figure 6:
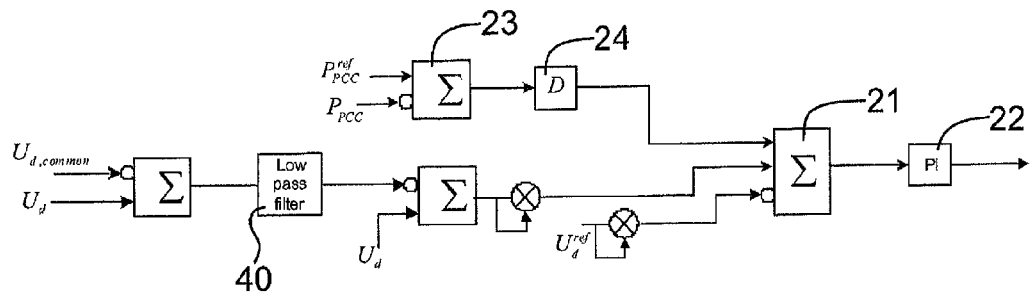
FIG. 6 illustrates an embodiment of the control device and method in accordance with the present invention.

With reference next to FIG. 6 another embodiment of the present invention is described, the figure illustrating a case wherein the common reference signal $U_{d,common}$ is obtained through communication. If for example converter stations close to the pilot node are disconnected then poorly damped oscillations may occur. In the embodiment shown in FIG. 6, the dynamic performance is improved, avoiding such situation of poorly damped oscillations. The difference between the common voltage, i.e. the feedback signal $U_{d,common}$, and the local converter voltage $U_d$ is filtered through a low pass filter 40, so that high frequency content is suppressed. This difference is then subtracted from the local voltage $U_d$. An advantage obtained is that during a transient, the control is based on the local voltage $U_d$. However, when steady state is approached and the transients have died down, the local voltage feedback signals before and after the low pass filter cancel out one another and the control is based on the voltage that is common to all converter stations being on droop control.

Figure 7:
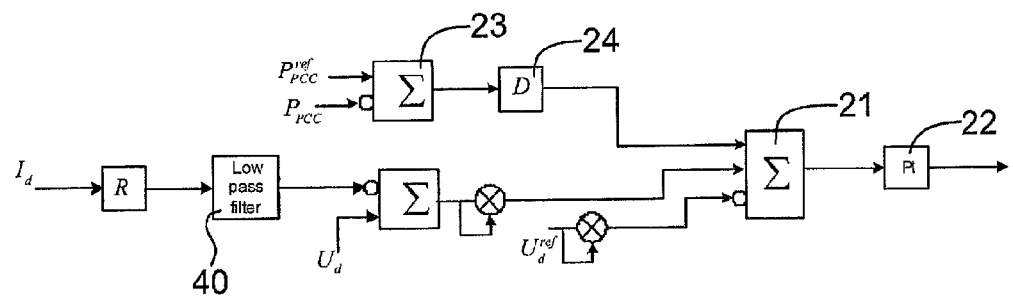
FIG. 7 illustrates another embodiment of the control device and method in accordance with the present invention.

FIG. 7 illustrates the use of low pass filter for an embodiment, wherein the common voltage $\tilde{U}_{d,common}$ is obtained through compensation. It can be seen that the control can be simplified in that the error signal $U_{d,common} - U_d$ of the previous embodiment need not be calculated. Instead a local current $I_d$ is measured, the current injected into the DC grid 1 by the converter.

It is noted that the described embodiments are not restricted to a particular kind of low pass filter; different kinds of low pass filters can be used, and in particular any implementation that suppresses frequencies above a certain cut-off frequency. The cut-off frequency can advantageously be quite low since the aim is to capture the steady state behavior of the common voltage signal.

Figure 8:
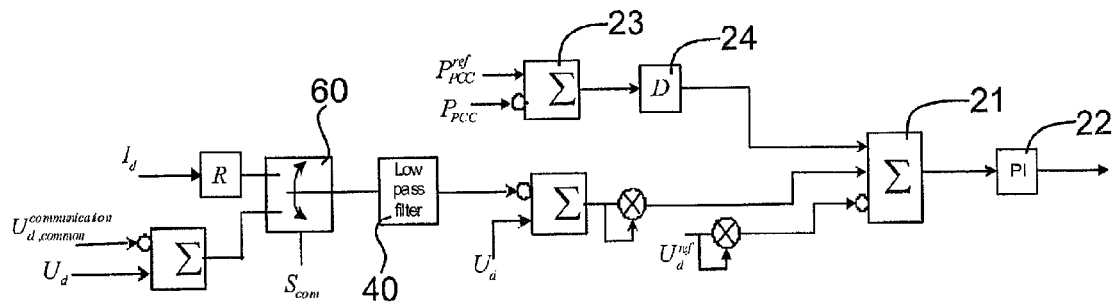
FIG. 8 illustrates yet another embodiment of the control device and method in accordance with the present invention.

FIG. 8 illustrates yet another embodiment of the present invention, wherein both main approaches of obtaining the common feedback signal $U_{d,common}$ and $\tilde{U}_{d,common}$, respectively, are combined. A switch 60 is introduced for automatically selecting input to lowpass filter in dependence on whether communication is available or not. When communication is available, i.e. $S_{com}=1$ the common voltage signal is obtained through communication, thus using $U_{d,common}$, and if communication is lost, i.e. $S_{com}=0$, then compensation is used instead, thus using $\tilde{U}_{d,common}$.

In the event of a planned communication interruption the pilot converter station(s) switchover to compensation mode (non-communication mode) could be done in a non-automatic way, that is, by means of operator intervention. However, if during operation any fault develops within communication channels or in pilot node(s), an automatic switchover is necessary from communication mode to the non-communication mode. A status flag indicating availability of both communication means C and pilot node(s) could be implemented in order to control mode of operation.

This provides a control system that during most of the time uses the communicated common feedback signal $U_{d,common}$, for example the pilot node voltage, with very good reference tracking, but occasionally for short period of time when communication is lost or unavailable, has a fall-back strategy based on compensation with slightly poorer reference tracking. This embodiment thereby provides a high performance as well as reliability.

Figure 9:
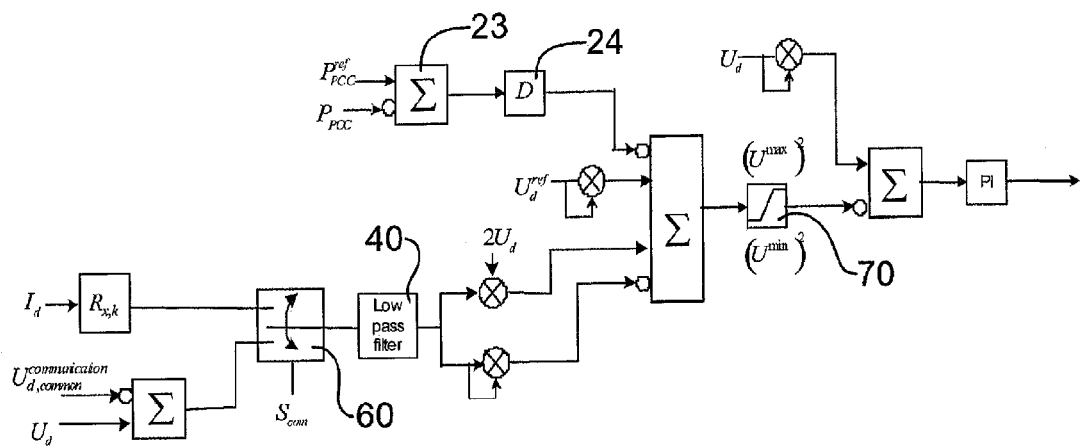
FIG. 9 illustrates still another embodiment of the control device and method in accordance with the present invention.

FIG. 9 illustrates still another embodiment of the invention. A limiter device 70 is introduced having the purpose to make sure that no matter what feedback signals are encountered, they will not drive the local converter voltage outside its allowed operating limits, $U^{max}$ and $U^{min}$. It is noted that for the case when the feedback signals give a reference voltage lying within the given limits, FIG. 9 is equivalent to FIG. 8.

Some additional aspects on the determination of droop constants are presented in the following. When communication is available, the choice of droop constant is a compromise between the need to prevent converter voltages from reaching their operating limits on one hand and the speed of convergence of converter power outputs on the other hand. In the case communication is available, reducing the droop coefficients of all the power-voltage-squared droop controlled converter stations 10a, 10b, 10c, 10d, 10e in the DC grid 1 results in a smaller variation of converter voltages upon the loss of a converter station. Selecting relatively small droop coefficients may prevent the converter stations from reaching their voltage limits in single contingencies. On the other hand, obtained simulation results show that reducing the droop coefficient reduces the speed of convergence of converter power outputs to their respective references, thus the trade off.

In case the communication is lost, i.e. when using compensation, the choice of droop coefficient is a compromise between the need to prevent converter voltages from reaching their limits upon a single contingencies on one hand and the need to contain the power tracing error resulting from either a dc voltage measurement error or the lack of a equivalent star network. In similarity with the above case, reducing the droop coefficients of all the power-voltage-squared droop controlled converters in the DC grid results in a smaller variation of converter voltages upon loss of a converter. Selecting relatively small droop coefficients is thus a way of keeping the converters from reaching their voltage limits during such contingencies. On the other hand, it can be shown that the power reference tracking error of a converter due to a dc voltage measurement error or lack of star equivalent network is inversely proportional to its droop coefficient. Further, the speed of response of the control loop does not become an issue in this mode.

It is thus noted that the droop constant may be adapted, i.e. changed, in dependence on whether communication is available or not. Further, the voltage reference $U_d^{ref}$ may also be adapted in dependence on whether communication is available or not.

Figure 10:
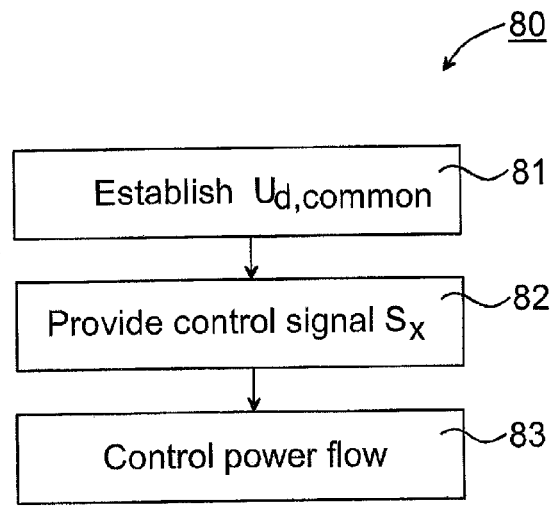
FIG. 10 illustrates a flow chart over steps of a method in accordance with the present invention.

FIG. 10 illustrates a flow chart over steps included in the method in accordance with the invention for controlling power flow within the DC grid 1 comprising two or more interconnected converter stations. It is noted that the method may comprise additional steps (not illustrated) in accordance with the different embodiments. The method comprises the first step 81 of establishing a common feedback signal $U_{d,common}$ for the converter stations. The common feedback signal $U_{d,common}$ is based on an overall voltage level in the DC transmission power network 1 as described earlier.

The method 80 comprises the second step 82 of providing a control signal $S_1$, $S_2$, $S_3$, $S_4$ based on the common feedback signal $U_{d,common}$ and on a drooped power error signal $P_{e,droop}$. The control signal $S_1$, $S_2$, $S_3$, $S_4$ is described more in detail with reference to FIGS. 4a-4.

The method 80 comprises the third step 83 of controlling the power flow within the DC power transmission network 1 towards one or more set operating points $U_d^{ref}$, $P_{PCC}^{ref}$ by using the control signal $S_1$, $S_2$, $S_3$, $S_4$ provided in step 82.

In an embodiment, the converter stations 10a, 10b, 10c, 10d, 10e comprises communication means C, described earlier, enabling communication them between. The step of establishing the common feedback signal then comprises communicating, by means of the communication means C, the common feedback signal $U_{d,common}$.

In another embodiment, the common feedback signal $U_{d,common}$ is determined as the voltage level measured at a predetermined converter station and then communicated to all of the other converter stations 10a, 10b, 10c, 10d, 10e.

In yet another embodiment, the common feedback signal $U_{d,common}$ is determined by combining, e.g. as an average, of voltage levels measured at a number of converter stations.

In another embodiment, a number of the converter stations 10a, 10b, 10c, 10d, 10e regulates its respective voltage in dependence on the common feedback signal $U_{d,common}$ and in proportion to a droop constant D that is individually determined for each particular converter station 10a, 10b, 10c, 10d, 10e.

In the previous embodiment, the method may then comprise the further step of adapting the droop constant D in dependence on whether communication between the converter stations 10a, 10b, 10c, 10d, 10e is available or not. In case communication is lost for some reason, a reliable backup is provided.

In another embodiment, the method comprises the further step of adapting the voltage reference $U_d^{ref}$ in dependence on whether communication between the converter stations 10a, 10b, 10c, 10d, 10e is available or not.

In the embodiment wherein in the common feedback signal is established by communication, and in case the communication is not available, the common feedback signal $\tilde{U}_{d,common}$ is estimated by means of local measurements in each of the converter stations 10b, 10c, 10d, 10e. In case communication is lost for some reason, a reliable backup is thus provided.

In the previous embodiment, the method may then comprise determining the common feedback signal by $$\tilde{U}_{d,common} = U_d - RI_d$$

where $I_d$ is a measured current injected into the DC power transmission network 1 by each respective converter station 10a, 10b, 10c, 10d, 10e and where R is a compensation factor. Preferably, communication is used in the first place and if no communication is available, then the common feedback signal is determined by means of local measurements.

In still another embodiment, the step of establishing 81 a common feedback signal $U_{d,common}$ for the converter stations, comprises determining the common feedback signal $\tilde{U}_{d,common}$ based on local measurements in each of the converter stations 10a, 10b, 10c, 10d, 10e. An alternative solution to the use of communication for establishing the common feedback signal is thus provided, which may be valuable for example in case the provision of communication means is difficult.

In the above embodiment, the common feedback signal may be determined in accordance with $$\tilde{U}_{d,common} = U_d - RI_d$$

where $I_d$ is a measured current injected into the DC power transmission network 1 by each respective converter station 10a, 10b, 10c, 10d, 10e and where R is a compensation factor.

In another embodiment, the method comprises the further step of filtering the common feedback signal by the low-pass filter 40 before using it in regulating voltage and/or power of the converter station 10a, 10b, 10c, 10d, 10e. The cut-off frequency of the filter may advantageously be chosen low, thereby capturing the steady state behavior of the common feedback signal.

In another embodiment, the method comprises the further step of preventing the common feedback signal from exceeding a pre-set limit. This may be implemented by using the earlier described limiting means 70.

The common feedback signal $U_{d,common}$, $\tilde{U}_{d,common}$ may be based on one or more measured or calculated voltages reflecting the overall voltage level in the DC grid 1. Stated differently, the overall voltage level in the DC transmission power network can be reflected by using one or several measured or calculated voltages within the DC grid 1.

The invention also encompasses computer program product 19 loadable into a memory of a computer 16 controlling the converter station 10a, 10b, 10c, 10d, 10e. The computer program product 19 comprises software code portions for carrying out the method as described above.

It is to be noted that although the invention has been described in connection with voltage squared control, other control methods could be implemented, for example the linear voltage control mentioned in relation to FIG. 4d.

The invention claimed is:

1. A method for controlling power flow within a DC power transmission network comprising two or more interconnected converter stations, said method comprising the steps of:
   establishing a common feedback signal ($U_{d,common}$, $\tilde{U}_{d,common}$) for said converter stations, said common feedback signal ($U_{d,common}$, $\tilde{U}_{d,common}$) being based on a voltage level at one, two or more converter stations in said DC transmission power network;
   providing, in said converter stations, a control signal ($S_1$, $S_2$, $S_3$, $S_4$) based on said common feedback signal ($U_{d,common}$, $\tilde{U}_{d,common}$) and a drooped error signal ($P_{e,droop}$, $U_{e,droop}$) and controlling said power flow within said DC power transmission network towards set operating points ($U_d^{ref}$, $P_{PCC}^{ref}$) by using said control signal ($S_1$, $S_2$, $S_3$, $S_4$), wherein said converter stations comprises communication means enabling communication them between, and wherein said step of establishing a common feedback signal comprises communicating, by means of communication means, a common feedback signal ($U_{d,common}$) to said converter stations.

2. The method as claimed in claim 1, wherein said common feedback signal ($U_{d,common}$) is determined as the voltage level at a predetermined converter station.

3. The method as claimed in claim 1, wherein said common feedback signal ($U_{d,common}$) is determined by combining at least two voltage measurements at two or more of said converter stations.

4. The method as claimed in claim 3, wherein said common feedback signal ($U_{d,common}$) is determined by averaging said at least two voltage measurements.

5. The method as claimed in claim 1, wherein a number of said converter stations regulates its voltage in dependence on said common feedback signal ($U_{d,common}$) and in proportion to a droop constant individually determined for each particular converter station.

6. The method as claimed in claim 4, comprising the further step of adapting a droop constant in response to that said communication between said converter stations becomes unavailable.

7. The method as claimed in claim 1, comprising the further step of adapting a voltage reference ($U_d^{ref}$) in response to that said communication between said converter stations becomes unavailable.

8. The method as claimed in claim 1, wherein in case of said step of communicating said common feedback signal ($U_{d,common}$) is followed by a failure to communicate said common feedback signal, determining the common feedback signal ($\tilde{U}_{d,common}$) by means of local measurements in each of said converter stations.

9. The method as claimed in claim 8, wherein said common feedback signal is determined by $$\tilde{U}_{d,common} = U_d - RI_d$$

where $U_d$ is a DC voltage at a DC terminal of each respective converter station, $I_d$ is a measured current injected into said DC power transmission network by each respective converter station, and R is a compensation factor.

10. The method as claimed in claim 1, comprising the further step of filtering said common feedback signal ($U_{d,common}$, $\tilde{U}_{d,common}$) a low-pass filter before using it in regulating voltage and/or power of said converter station.

11. The method as claimed in claim 1, comprising the further step of preventing, using limiting means, said common feedback signal from exceeding a pre-set limit.

12. The method as claimed in claim 1, wherein said common feedback signal ($U_{d,common}$, $\tilde{U}_{d,common}$) is based on one or more measured or calculated voltages reflecting said overall voltage level in said DC transmission power network.

13. A computer program product loadable into a memory of a computer controlling a converter station, said computer program product comprising software code portions for carrying out the method as claimed in claim 1.

14. A multi-terminal DC power transmission system including two or more interconnected converter stations, characterized in that each converter station includes a local control unit for controlling the power flow in the DC power transmission system, and in that at least one of the converter stations is operated as a pilot node and having the local control unit adapted for establishing a common feedback signal ($U_{d,common}$, $\tilde{U}_{d,common}$) for said converter stations, said common feedback signal ($U_{d,common}$, $\tilde{U}_{d,common}$) being based on a voltage level at one, two or more converter stations in said DC transmission power network, the local control units of the converter stations comprising control means for outputting a control signal ($S_1$, $S_2$, $S_3$, $S_4$) based on the feedback signal ($U_{d,common}$, $\tilde{U}_{d,common}$) common to said converter stations and a drooped error signal ($P_{e,droop}$, $U_{e,droop}$), where the power flow within the DC power transmission network is controlled towards set operating points ($U_d^{ref}$, $P_{PCC}^{ref}$) using the control signal ($S_1$, $S_2$, $S_3$, $S_4$), and the converter stations including communication means enabling communication them between, and wherein the common feedback signal is communicated by means of the communication means to the converter stations.

15. The multi-terminal DC power transmission system as claimed claim 14, wherein the local control unit includes filtering means for filtering said common feedback signal.

16. The multi-terminal DC power transmission system as claimed in claim 14, the local control unit further comprising a limiting means arranged to prevent steady state voltage of said converter station from exceeding an operating voltage limit of said converter station.

17. The multi-terminal DC power transmission system as claimed in claim 14, the local control unit further comprising a switch arranged to select whether to obtain said feedback signal by communication ($U_{d,common}$) or by compensation ($\tilde{U}_{d,common}$) in response to whether the communication is available or occasionally lost.

18. The method as claimed in claim 2, wherein a number of said converter stations regulates its voltage in dependence on said common feedback signal ($U_{d,common}$) and in proportion to a droop constant individually determined for each particular converter station.

19. The method as claimed in claim 3, wherein a number of said converter stations regulates its voltage in dependence on said common feedback signal ($U_{d,common}$) and in proportion to a droop constant individually determined for each particular converter station.

20. The method as claimed in claim 4, wherein a number of said converter stations regulates its voltage in dependence on said common feedback signal ($U_{d,common}$) and in proportion to a droop constant individually determined for each particular converter station.

* * * * *